Sept. 6, 1949.    F. W. KOLLER    2,481,430
PRESSURE SEAL FOR ROTARY JOINTS
Filed March 8, 1946
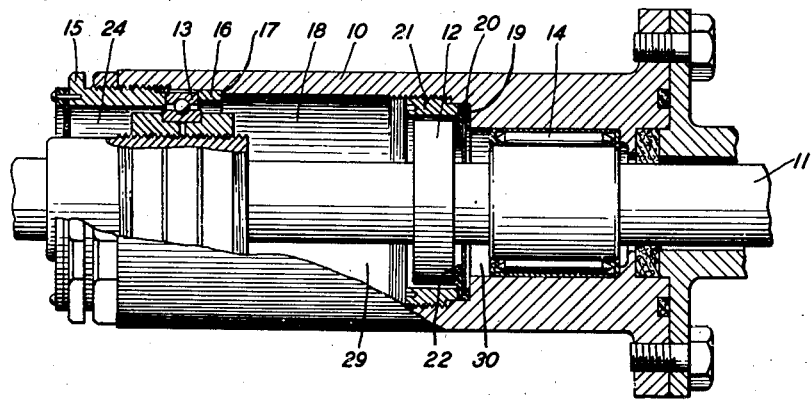
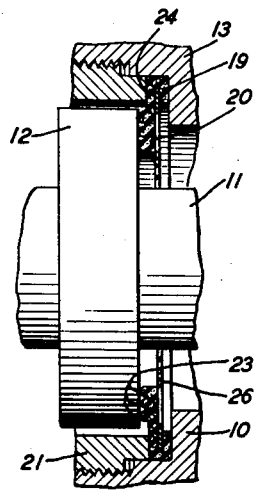
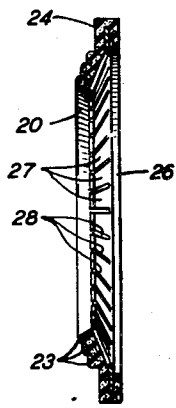
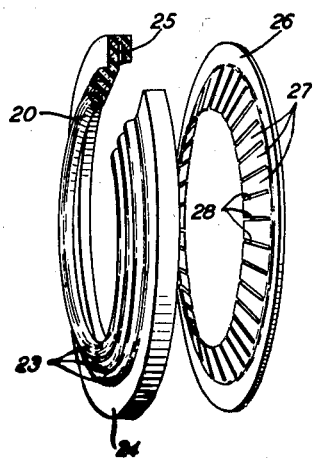
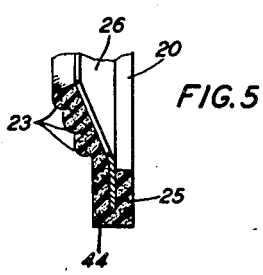
INVENTOR
F. W. KOLLER
BY J. MacDonald
ATTORNEY Patented Sept. 6, 1949

2,481,430

UNITED STATES PATENT OFFICE 2,481,430

PRESSURE SEAL FOR ROTARY JOINTS

Fredrick W. Koller, Huntington, N. Y., assignor to Bell Telephone Laboratories, Incorporated, New York, N. Y., a corporation of New York Application March 8, 1946, Serial No. 653,067

2 Claims. (Cl. 286—11)

1

This invention relates to pressure seals and more particularly to a sealing device adapted to be positioned about a rotatable shaft located within a tubular housing, to interrupt the flow of a fluid material without causing undue friction or wear on the shaft.

The object of the present invention is the provision of a sealing device which will be simple in construction, economical to manufacture and effective in operation.

Another object of the invention is the provision of a sealing device which will effectively seal against the passage of fluid by exerting a lateral pressure instead of an annular pressure on the rotating shaft.

A further object of this invention is the provision of a seal which will retain a generous supply of suitable lubricant to reduce to a minimum the amount of friction and to also act as a further sealing medium.

The invention as herein disclosed comprises a dish-shaped washer composed of a suitable resilient material, for example, synthetic rubber, neoprene or the like. It is circular in configuration and is provided with spaced apart annular ridges or rings on the convex surface thereof. A thin metallic reinforcing ring of suitable spring material, is embedded in the washer to maintain it dish-shaped.

The seal is made by forcing the washer against a shoulder on a rotatable shaft with the annular ridges or rings in engagement with the shoulder by suitable means on the interior of a fixed tubular member within which the shaft is mounted.

The invention will be more clearly understood from the following detailed description when read in connection with the accompanying drawing in which:

Fig. 1 is a fragmentary view partly in section of the device of this invention in position on a rotatable shaft mounted in a tubular housing;

Fig. 2 is an enlarged fragmentary view of a portion of Fig. 1 and illustrates the device of this invention more in detail;

Fig. 3 is a cross-sectional view of the resilient washer and the metal reinforcing ring;

Fig. 4 is an exploded perspective view partly in section with the metal reinforcing ring removed from the resilient washer; and Fig. 5 is an enlarged fragmentary view in cross-section of the device as shown in Fig. 3.

As shown in Fig. 1 of the drawing, the housing 10, has journaled therein a longitudinally extending shaft 11. This shaft is provided with

2 an annular shoulder 12 and is rotatably supported by means of suitable bearings 13 and 14 located on each side of the shoulder 12. The inboard bearing 14 is held in place by being press-fitted into the housing 10 and the outboard bearing 13 is held in position by means of a gland nut 15 which forces the bearing 13 against the ring 16 which in turn is positioned against the shoulder 17 in the counterbored portion 18 of the housing 10.

The central bore of the housing 10 is provided, adjacent the bearing 13, with an annular step or shoulder 19. Located around the shaft 11 and positioned between the rear face of the shoulder 12 and the step 19 is the sealing device 20. This seal 20 is held against the step 19, by means of a threaded locking ring 21 which threadedly engages the bore of the housing 10 and bears against the outer edge of the seal 20.

The seal 20, as shown in Figs. 1 and 2, and more in detail in Figs. 3, 4 and 5, comprises a dished washer or ring 22 of suitable resilient material, for example synthetic rubber, neoprene or the like and having an opening therein substantially larger than the shaft and having on its convex side a plurality of annular ridges or rings 23 and a radial flange 24 at its periphery. Embedded in the washer 22 with its periphery located in an internal groove 25, in the shoulder 24 of the washer 22, is the metallic reinforcing ring 26. This ring, as shown in Fig. 4, has substantially the same configuration as the washer 22 and is provided on its convex surface with a plurality of spring teeth or fingers 27 which are formed by the radial slits 28 and which bear against the inner surface of the washer 22 and maintain it in its dished or convex shape.

However, as shown in Figs. 1 and 2, when the seal 20 is in position between the shoulder 12 and the step 19, and the shoulder is forced into engagement with the annular ridges 23, against the tension of the metallic ring 26, the dished or convex surface of the washer 22 will flatten out, as shown, thereby bringing into contact with the shoulder 12, the ridges 23 thereby effectively sealing the joint at this location. A suitable lubricant may be placed in the grooves between the ridges 23 to further seal the joint and to reduce the friction between the seal 20 and the shoulder 12 by assuring a suitable lubricant therebetween.

From the foregoing it will be observed that unlike the seals in common practice, the seal of this invention does not depend on the annular friction exerted between the shaft and the sealing member to maintain the joint or seal gas-tight, for example, between the chambers 29 and 30, but uses the lateral pressure of a member, having annular ridges thereon against a shoulder on the shaft to effect the seal.

Not only does the seal of this invention contribute to a more effective seal but it materially reduces the friction on the shaft and consequently materially lengthens the life of the seal and the component parts.

It has been found that at ultra-high speeds the seal of this invention lost none of its effectiveness over long periods of time and consequently did not need the servicing usually attendant on such devices. It was further found that this seal met all the necessary requirements for pressure seals of this type intended for operation at very high and very low temperatures.

While I have shown and described the preferred embodiment of my invention it is to be distinctly understood that various changes and modifications may be made therein without departing from the spirit of the invention and I am only limited by the scope of the appended claims.

What is claimed is:

1. In an annular sealing device in combination, a fixed tubular member and a rotatable shaft member, an annular shoulder on the interior of said fixed member, a threaded collar positioned adjacent said shoulder, a sealing member positioned in said fixed member and having its periphery clamped between said collar and said shoulder, said sealing member comprising a dished ring of resilient material having embedded therein, but not extending beyond the periphery thereof, a metallic ring having a plurality of inwardly extending flexible fingers for reinforcing and exerting pressure on said resilient ring, said resilient ring provided on its convex surface with a plurality of spaced apart annular ridges of arc shape configuration, and having grease-retaining grooves therebetween, said shaft passing through said ring and having a shoulder thereon in engagement with the ridges on the surface of said resilient ring, and means on the interior of said fixed member for forcing said shoulder into intimate contact with said resilient ring to effect a seal therebetween.

2. In an annular sealing device in combination, a fixed tubular member and a rotatable shaft member, an annular shoulder on the interior of said fixed member, a threaded collar positioned adjacent said shoulder, a sealing member positioned in said fixed member and having its periphery clamped between said collar and said shoulder, said sealing member comprising a dished ring of resilient material having embedded therein, but not extending beyond the periphery thereof, a metallic ring having a substantially flat outer portion and a convex inner portion provided with a plurality of flexible fingers for reinforcing and exerting pressure on said resilient ring, said resilient ring provided on its convex surface with a plurality of spaced apart annular ridges of arc shape configuration, and having grease-retaining grooves therebetween, said shaft passing through said ring and having a shoulder thereon in engagement with the ridges on the surface of said resilient ring, and means on the interior of said fixed member for forcing said shoulder into intimate contact with said resilient ring to effect a seal therebetween.

FREDRICK W. KOLLER.

REFERENCES CITED

The following references are of record in the file of this patent:

UNITED STATES PATENTS

| Number | Name | Date |
|---|---|---|
| 2,221,554 | Okun | Nov. 12, 1940 |
| 2,279,669 | Friskney | Apr. 14, 1942 |
| 2,352,784 | Geyer | July 4, 1944 |
| 2,373,443 | Armington | Apr. 10, 1945 |